Figure 1:
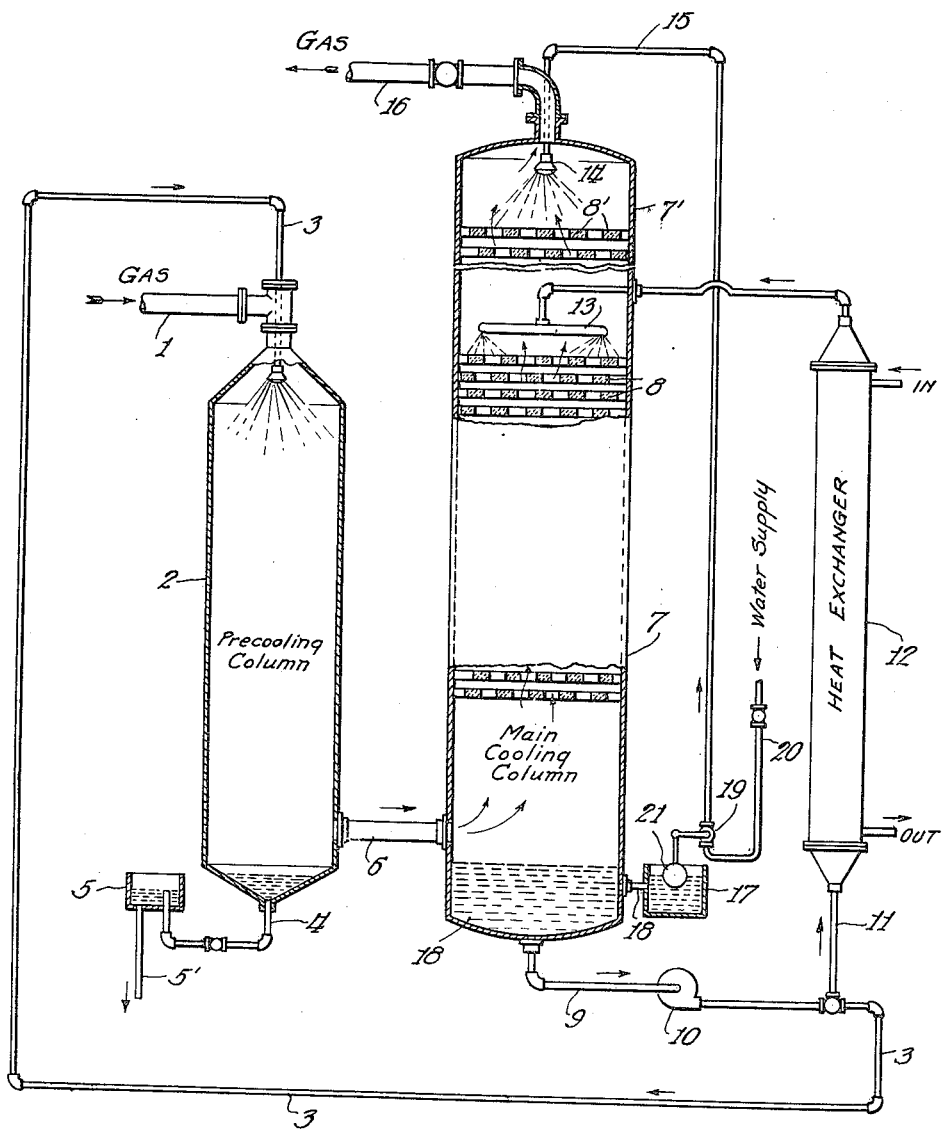

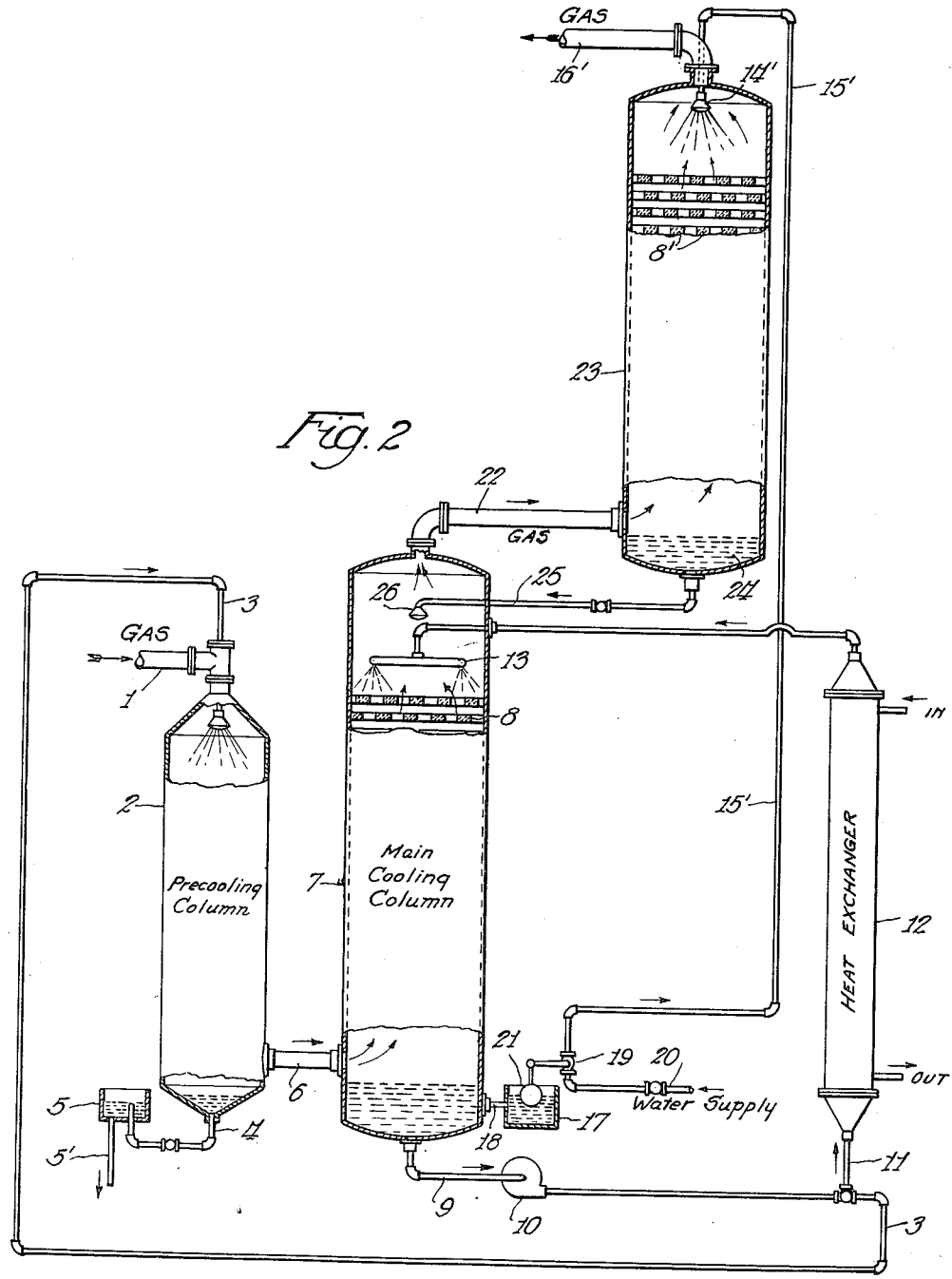

Patented May 27, 1952

2,598,116

UNITED STATES PATENT OFFICE 2,598,116

PROCESS FOR COOLING SULFUR BURNER GAS

Horace A. Du Bois, Neenah, Wis., assignor to Paper Patents Company, Neenah, Wis., a corporation of Wisconsin Application May 7, 1948, Serial No. 25,746

5 Claims. (Cl. 183—120)

The present invention comprises a process and apparatus for cooling gases containing sulphur dioxide as a step in the production of sulphite reagent for use in the treatment of wood pulp and relates in particular to the purification and cooling of gases derived by the combustion of sulphur in air. It is the object of my invention to most efficiently effect cooling of heated products of combustion derived from commercial sulphur burners in order to enhance their solubility in a sulphite reagent with the result of a high content of sulphur dioxide in the reagent.

Apparatus employing sprays of liquid, commonly water, for the cooling of sulphur combustion gases in some respects have advantages over other cooling means but also involve a disadvantage. The gases cooled by contact with a water spray become saturated with water vapor. The condensation of the water vapor when the gases are absorbed subsequently in the aqueous sulphite reagent contribute a considerable amount of latent heat of condensation to the sulphite reagent. Such liberation of latent heat in addition to the sensible heat derived from the gases used in preparing sulphite reagent raises the temperature of the reagent into which the gases are intended to go into solution to a level sufficiently high to seriously reduce the solubility of free sulphur dioxide in the reagent. The amount of water vapor carried away by the combustion gases may be reduced by lowering the temperature of the cooling spray, but this is not always practicable nor economical.

It is the object of the present invention to provide maximum cooling of combustion gases by means of water such as may be derived from a river, a pond or other natural source which in summer ordinarily has a temperature of about 75° to 85° F.

In the accompanying drawings:

Fig. 1 is a diagrammatic view partially in section of apparatus embodying certain features of the invention; and Fig. 2 is a diagrammatic view partially in section of apparatus embodying certain other features of the invention.

In the preferred gas cooling system of the present invention shown in Fig. 1, a main countercurrent trickle cooling column is provided having a side branch circulatory heat exchange cooling system. The side branch derives liquid from the bottom of the main column, conducts the liquid through a heat exchanger and restores the cooled liquid to an intermediate region in the main column. Cooling in the main column is effected by contact of the hot gases with films of the cool liquid trickling over inert material which provides many interstitial circulatory spaces.

A novel feature of this cooling system is the provision of a countercurrent tertiary cooling column operating with fresh make up water which feeds the main trickle or second cooling column and is located above the portion of the main column containing the circulating liquid. In other words, the partially cooled combustion gases are subjected to cool make up water feeding the main column on the last part of their way to the absorbing tank after having been cooled. An amount of water or other liquid absorber substantially equal to the amount of liquid which is introduced into the space above the circulatory part of the main column is withdrawn from the bottom of the main column and is introduced as a spray at the top of a precooling column through which the heated combustion gases first flow on their way to the main column. In step with the introduction of liquid as a spray into the precooling column an equal amount of cooling liquid is withdrawn continuously from the precooling column and is utilized for heating or other purposes or is discharged as waste liquid. Due to the described preliminary cooling of gases in apparatus embodying the present invention the gases before coming into contact with the cooling liquid of the third and final column which feeds the main column have been so much reduced in temperature that they do not carry away a high content of water vapor which would unduly heat the gas-absorbing reagent into which they are conducted.

A modification of the above described system is shown in Fig. 2. In this modification the tertiary cooling column is located in a separate tower or shell instead of being located in the upper part of the second or main cooling column as shown in Fig. 1. This first described system is, however, ordinarily more economical and convenient than the modification shown in Fig. 2 and it is for this reason that the system shown in Fig. 1 is generally preferred. In the drawings both tertiary cooling columns are provided with tower packing (inert material) to insure intimate contact between the gas and cool make up water. If desired, however, the packing may be omitted and the tertiary or final cooling columns operated with countercurrent water sprays.

My invention will be described with greater particularity in connection with the accompanying drawings which show conventionally gas cooling systems embodying the present invention.

In the system illustrated in Fig. 1 hot gaseous combustion products resulting from the burning of sulfur in air and which may have a temperature in the range of 1000°–2400° F. pass through the intake conduit 1 concurrently into a spray of liquid in a primary or precooling column 2. The spray of liquid which is supplied by a pipe 3 is derived from a subsequent cooling column in the system to be later described. In the present description this liquid will be assumed to be a warm acid liquor with about 1 per cent by weight of $SO_2$ in solution and about 0.2 per cent by weight of $SO_3$. The temperature of the liquor entering this precooling column is usually of the order of 120° F. This temperature is not critical because after intimate contact with the hot gases in the primary tower the temperature of both the liquor and gas will become equal to the wet-bulb temperature. The large reduction of temperature of the gas which results is due to the evaporation of a small portion of the spray liquor and the heat is carried on with the gas as latent heat in proportion to the water vapor content. The temperature of the water may rise to about 130°–160° F. depending upon the temperature of the gas entering the precooling column. At this elevated temperature very little sulphur dioxide can remain dissolved in the hot water which is thus stripped of its sulphur dioxide content. Thus without the substantial loss of sulphur dioxide hot liquor which contains dissolved $SO_3$ may be taken off continuously from the precooling column as indicated by a pipe 4 leading from the bottom of column 2 to a basin 5 provided with a discharge pipe 5'. The $SO_3$ content in the hot liquor, which may increase to the order of about 0.3 per cent during the passage through the primary tower, is a troublesome (unwanted) component and its removal from the system is another advantage of the process of the present invention.

The partially cooled combustion gases pass from the first cooling column through a conduit 6 into the second or main cooling column 7 near the lower end thereof and rise through a mass of interstitial inert material 8, over the surface of which the cooling liquid is trickling, thereby further cooling the combustion gases. The liquid which is made up of circulated liquor and liquor from the tertiary cooling column flows countercurrent to the gases and may become heated to about 110°–130° F. It is withdrawn from the lower end of the main column 7 through a pipe 9 by a pump 10. A part of the heated liquor which is withdrawn is conducted to the precooling column 2 by the pipe 3 as previously explained. Another portion of heated liquor is conducted by a pipe 11 through a heat exchanger 12 where its temperature is reduced. The cooled liquor then is restored to the main cooling column by a spray head 13 which is located above the sub-divided material 8. The temperature differential between the recirculated liquor entering the main cooling column and the gas leaving the main cooling column may be in the order of about 20° F. The recirculated liquor entering the main column, for example, may have a temperature of about 92° F. and the gas leaving the main column may have a temperature of about 112° F. In the summertime the cooling water entering the heat exchanger will have a temperature of about 85° F. and it will leave the exchanger with a temperature of about 110° F.

The partially cooled gases pass from the top of the main column to a third or tertiary cooling column 7' spaced as shown in Fig. 1 above the main column 7. Fresh make up water is delivered by pipe 15 to spray head 14 and the gases rise through a mass of interstitial inert material 8' over the surface of which the cooling water is trickling. As previously mentioned the inert material may be omitted in this column and the gases merely passed countercurrent to the spray of fresh make up water. In either case the liquid from the tertiary cooling column feeds into and joins with the recirculating liquor at the top of the main column. The gases after receiving their final cooling treatment in the tertiary cooling column, pass on to the gas outlet 16. The temperature of the make up water at spray head 14 when taken, for example, from a pond in the summer season may be about 85° F. The outflowing gases may be cooled by such water to about 90°–92° F. Due to the reduced temperature and low vapor content of the outflowing gases, a sulphite reagent with the desirably high sulphur dioxide content may be obtained with resulting efficiency of such reagent in the wood digestion process.

The control of the rate of delivery of fresh make up water to the spray head 14 may be accomplished automatically by an apparatus which is responsive to the height of the water in a weir 17. The latter is in communication through a pipe 18 with a sump 18' at the bottom of the main column 7. Such apparatus is diagrammatically indicated by a valve 19 in the water supply pipe 20. The valve 19 is connected to a float 21 located in the weir 17.

The cooling system illustrated by Fig. 2 is the same as that described above with reference to the system illustrated by Fig. 1 except that the tertiary cooling column is located in a separate or third tower. In the system shown in Fig. 2, the partially cooled gases pass from the top of the main or second cooling column 7 through a conduit 22 to the tertiary or third cooling column 23 where the gases are cooled by contact with the fresh make up water supplied by pipe 15' to spray head 14'. The liquid 24 collecting at the bottom of the tertiary column passes by pipe 25 to spray head 26 located at the top of the main cooling column. In the system shown in Fig. 2 the gases coming from the top of the main cooling column 7 enter near the bottom of the tertiary cooling column 23 and are cooled by the fresh make up water as it trickles down inert material 8', or, if the inert material is not used, by the direct spray from spray head 14'. In either case the flow of the liquid is countercurrent to the flow of the gases which after receiving their final cooling treatment, pass on to the gas outlet 16'.

The countercurrent flow is not essential in the tertiary or third cooling column and if desired concurrent flow may be employed. This may be accomplished by mounting spray head 14' in conduit 22 (instead of at the top of the tertiary column) and by spraying the fresh make up water concurrent with the flow of the gas through conduit 22. With such an arrangement the conduit connecting the second or main cooling column and the third tower need not be positioned near the bottom of the third tower but may, for example, enter near the middle of the third tower. The operation of this system follows the system shown in Fig. 2 as the make up liquid sprayed through conduit 22 collects at the bottom of the third tower 23 and is fed by pipe 25 to the top of the second cooling column where it joins with the recirculated liquor, and the gases entering the third tower pass on to the gas outlet 16' as shown in Fig. 2.

In the apparatus of the present invention the highly heated sulphur-combustion gases come into heat interchange relation with fluids at progressively lower temperatures. The hot fluid or liquor encountered in the first or precooling column is heated by the hot combustion gases, to a temperature too high to retain any substantial amount of sulphur dioxide gas. Hence, it is stripped of its $SO_2$ content. A substantial proportion of this precooling fluid may be continuously abstracted without appreciable loss of valuable $SO_2$. The gases of reduced temperature pass on to the second or main cooling column containing circulating fluid of large surface area where the gases are further cooled, some of the heated fluid going to the precooling column. The gases finally go to the third or tertiary cooling column where they contact fluid of still lower temperature, the heated fluid going to the main cooling column. Although a substantial proportion of $SO_2$ gas is dissolved in the fluid in the tertiary column, such dissolved gas is subsequently ejected from solution as the liquor becomes heated progressively in the main and precooling columns. As a result a given supply of cooling fluid at a given temperature is more effectively utilized as a cooling agent and the combustion products from the sulphur burner (not shown) are reduced to a temperature sufficiently low to render absorption of such gases by the sulphite reagent more effective than was formerly possible.

While the cooling systems described above are adaptable for use in the summer season when the temperature of water in rivers and ponds is relatively high, it will be understood that the systems are also adaptable for use in the spring and fall seasons as well as the winter season when the temperature of available water may be around 35° F. or lower. The present invention thus provides the art with improved cooling systems which function satisfactorily under varying conditions of temperature encountered throughout the year.

I claim:

1. The method of cooling hot sulphur dioxide-containing gases which comprises bringing the gases in a precooling zone in contact with an aqueous liquor derived from a subsequently encountered second cooling zone, said liquor being heated by the hot gases in said precooling zone to a temperature at which the cooling liquor has negligible solubility for sulphur dioxide, bringing the resulting precooled gases in a second cooling zone in contact with an aqueous liquor derived in part from a subsequently encountered third cooling zone, abstracting a fraction of the liquor which has become heated by the gases in said second cooling zone, supplying the abstracted heated liquor to said precooling zone, bringing the resulting partially cooled gases in a third cooling zone in contact with cool water, feeding the resulting aqueous liquor derived from the cool water to the second cooling zone, and supplying the cool water to said third cooling zone at a rate substantially equal to the rate liquor is abstracted from the second cooling zone and supplied to the precooling zone.

2. The method of cooling hot sulphur dioxide-containing gases derived by the combustion of sulphur in air which comprises bringing the gases in a precooling column in contact with a concurrent spray of aqueous liquor derived from a subsequently encountered second cooling column, said liquor saturating the gases in said precooling column and in turn being heated by said gases to a temperature at which water has negligible solubility for sulphur dioxide, bringing the resulting precooled gases in a second cooling column in contact with countercurrent films of aqueous liquor derived in part from a subsequently encountered third cooling column and in part by cooled recirculated liquor from said second cooling column, abstracting a fraction of the liquor which has become heated by the gases in said second cooling column, supplying the abstracted heated liquor to said precooling column, bringing the resulting partially cooled gases in a third cooling column in intimate contact with cool water, feeding the resulting aqueous liquor in said third cooling column to said second cooling column, and supplying the cool water to said third cooling column at a rate substantially equal to the rate liquor is abstracted from the second cooling column and supplied to the precooling column.

3. The method of cooling hot sulphur dioxide-containing gases resulting from the combustion of sulphur in air which comprises bringing the gases while at a temperature of about 1000°–2400° F. into contact with a concurrent spray of aqueous liquor in a precooling zone, the liquor supplied to said precooling zone being derived from a subsequently encountered second cooling zone, bringing the resulting precooled gases into contact with countercurrent films of aqueous liquor in a second cooling zone, the liquor supplied to said second cooling zone being derived in part from a subsequently encountered third cooling zone and in part by cooled recirculated liquor from said second cooling zone, abstracting a portion of the liquor which has become heated by contact with the gases in said second cooling zone, supplying the abstracted heated liquor to said precooling zone, bringing the resulting partially cooled gases into contact with cool water at a temperature of about 35°–85° F. in a third cooling zone, feeding the liquor formed by the contact of the water and gases in the third cooling zone to said second cooling zone, and supplying the cool water to said third cooling zone at a rate substantially equal to the rate liquor is abstracted from the second cooling zone and supplied to the precooling zone.

4. The method of cooling hot sulphur dioxide-containing gases which comprising contacting the gases in a precooling zone with a concurrent spray of aqueous sulphur dioxide-containing liquor derived from a subsequently encountered main cooling zone, said liquor saturating the gases in said precooling zone and in turn being heated by said gases to a temperature sufficiently high to strip sulphur dioxide from the liquor, contacting the resulting precooled gases in a main cooling zone with countercurrent films of aqueous liquor derived from a subsequently encountered tertiary cooling zone and from cooled recirculated liquor from said main cooling zone, abstracting a portion of the liquor which has become heated by the gases in said main cooling zone, supplying the abstracted liquor to said precooling zone, contacting the resulting partially cooled gases with cool water in a tertiary cooling zone located above the main cooling zone, feeding the liquor resulting from the contact of the water with the gases in the tertiary zone to said main cooling zone, and supplying the water to said tertiary cooling zone at a rate substantially equal to the rate liquor is abstracted from the main cooling zone and supplied to the precooling zone.

5. In the method of cooling hot sulphur dioxide-containing gases derived by the combustion of sulphur in air and in which a stream of said gases are brought successively into heat interchange relation with a plurality of cooling liquids having progressively lower range of temperatures, the steps comprising: bringing the hot gases into contact with a first cooling liquid, said first cooling liquid cooling said gases and in turn being heated by the gases to a temperature at which the liquid has negligible solubility for sulphur dioxide, bringing the resulting precooled gases into contact with a second cooling liquid, said second cooling liquid cooling said gases and in turn being heated by the gases, abstracting a portion of the heated second cooling liquid and supplying said heated portion as the first cooling liquid, cooling another portion of the heated second cooling liquid and supplying said cooled portion as part of the second cooling liquid, bringing the resulting partially cooled gases into contact with an externally derived third cooling liquid, said third cooling liquid cooling said gases and in turn being heated by the gases, supplying the heated third cooling liquid as another part of the second cooling liquid, and regulating the quantity of liquid supplied as said third cooling liquid so that it is substantially equal to the amount of heated second cooling liquid supplied as the first cooling liquid.

HORACE A. DU BOIS.

REFERENCES CITED

The following references are of record in the file of this patent:

UNITED STATES PATENTS

| Number | Name | Date |
|---|---|---|
| 432,604 | Cornwell | July 22, 1890 |
| 890,450 | Plantinga | June 9, 1908 |
| 1,314,802 | Hechenbleikner | Sept. 2, 1919 |
| 1,793,620 | Jacobus | Feb. 24, 1931 |
| 1,945,600 | Coubrough | Feb. 6, 1934 |
| 2,047,628 | Haglund | July 14, 1936 |
| 2,137,735 | Von Der Emde | Nov. 22, 1938 |
| 2,299,130 | Dill | Oct. 20, 1942 |
| 2,360,900 | Setterwall | Oct. 24, 1944 |
| 2,424,614 | Haun et al. | July 29, 1947 |

FOREIGN PATENTS

| Number | Country | Date |
|---|---|---|
| 20,667 | Great Britain | Sept. 12, 1913 |
| 781,154 | France | Feb. 18, 1935 |